Sept. 24, 1968 H. B. KAMIN ET AL 3,402,568
QUICK FREEZING OF FOOD PRODUCTS
Filed June 25, 1965 3 Sheets-Sheet 2
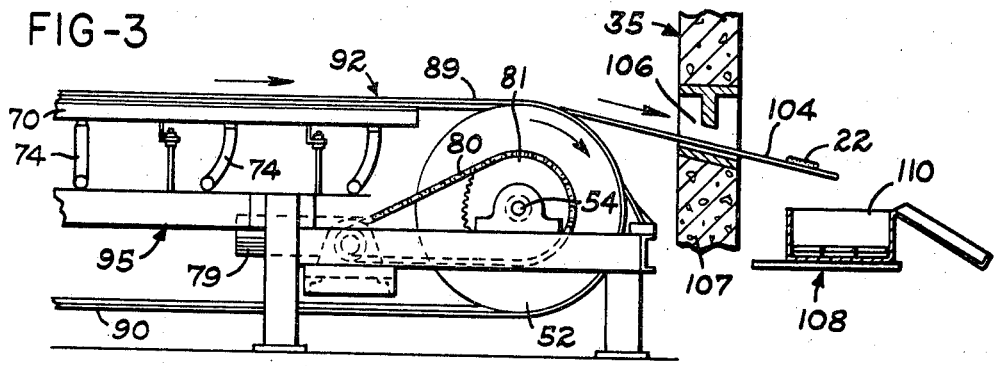
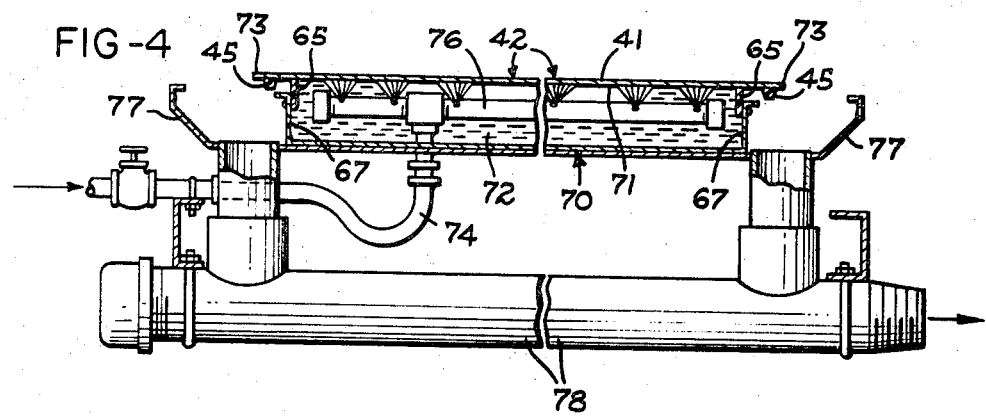
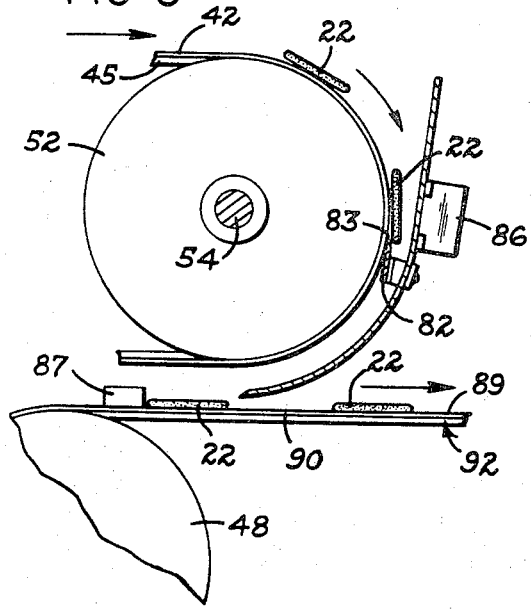
INVENTORS
HAL B. KAMIN &
MILTON ROSENTHALER
Marechal, Biebel, French & Bugg
ATTORNEYS Sept. 24, 1968
H. B. KAMIN ET AL
3,402,568
QUICK FREEZING OF FOOD PRODUCTS
Filed June 25, 1965
3 Sheets-Sheet 3
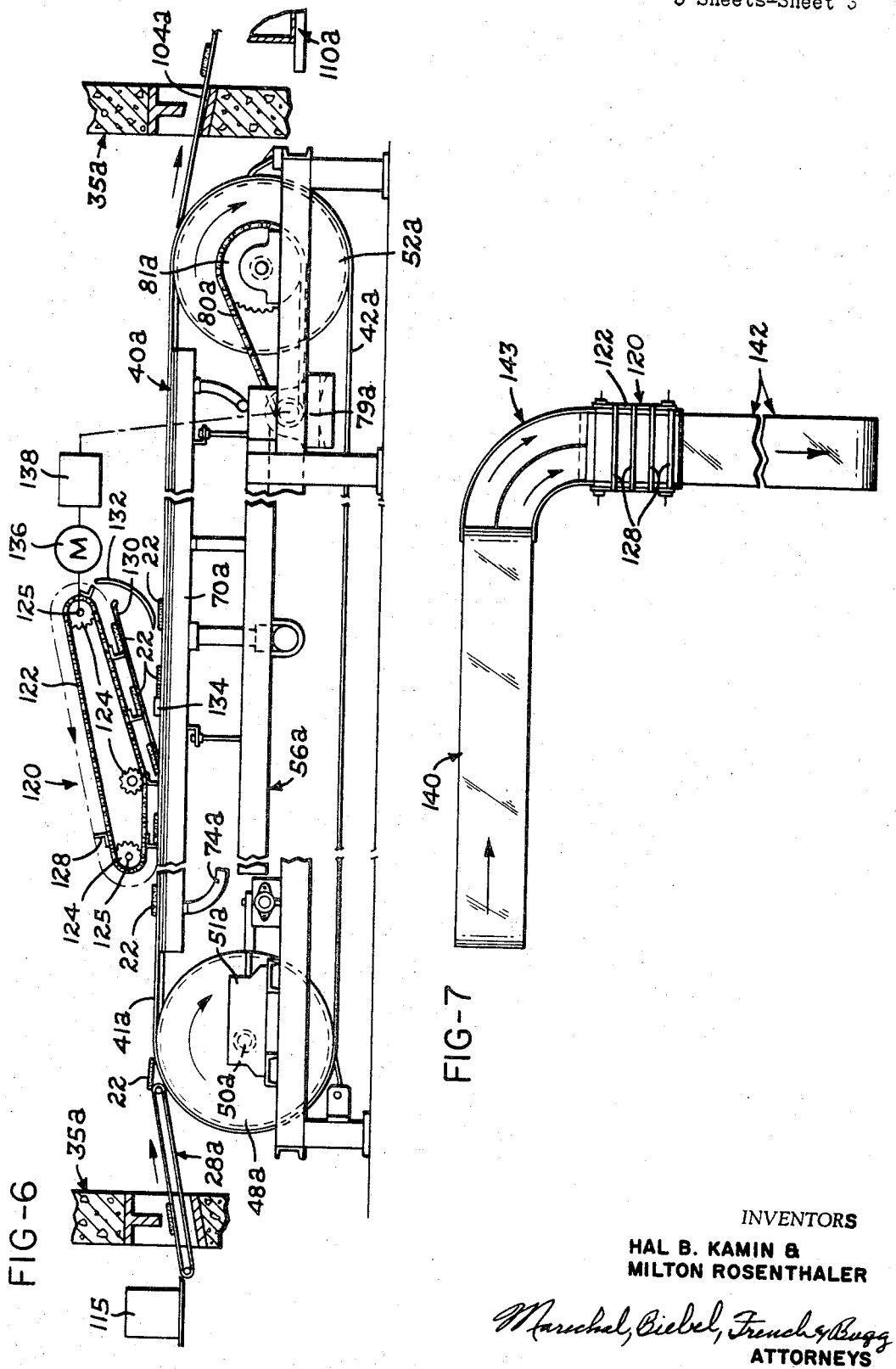
INVENTORS
HAL B. KAMIN &
MILTON ROSENTHALER
ATTORNEYS United States Patent Office 3,402,568
Patented Sept. 24, 1968

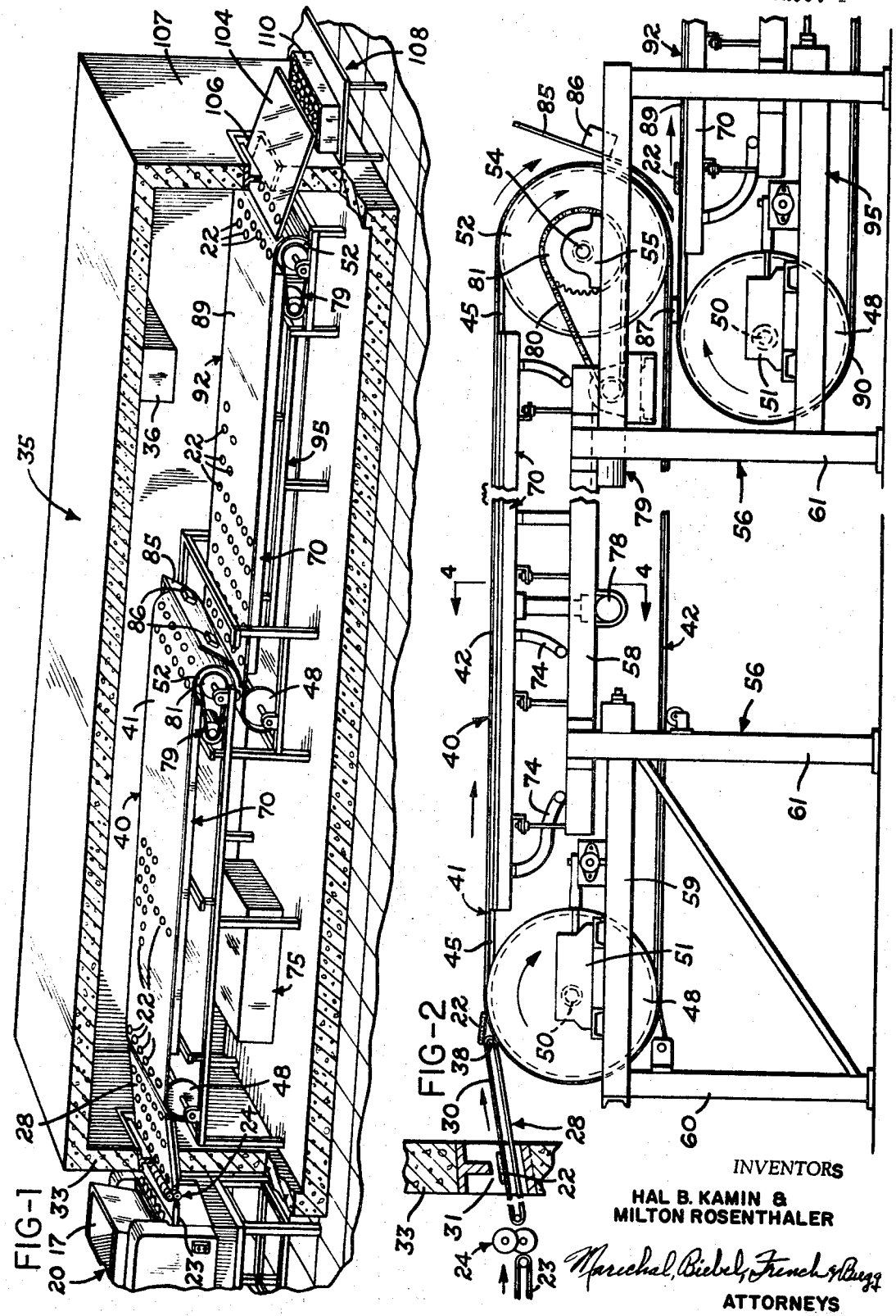

3,402,568
QUICK FREEZING OF FOOD PRODUCTS
Hal B. Kamin and Milton Rosenthaler, Dayton, Ohio, assignors to The Sucher Packing Co., Dayton, Ohio, a corporation of Ohio
Filed June 25, 1965, Ser. No. 467,009
7 Claims. (Cl. 62—380)

ABSTRACT OF THE DISCLOSURE

Articles such as individual serving portions of uncooked meat are frozen with unusual rapidity by placing one side of each article on an endless belt conveying surface which is refrigerated to transfer heat quickly from one side of each article and inverting the articles on a similarly refrigerated endless belt conveying surface to transfer heat quickly from the other side of the article. The conveying surfaces are enclosed within a refrigerated chamber to minimize both heat transfer from the conveying surfaces to the atmosphere and circulation of air adjacent the articles.

---

This invention relates to apparatus for freezing individual serving-size portions of uncooked meat such as steaks, hamburger patties and the like quickly to seal and retain in the meat substantially all of its original juices, and to maintain its good quality and attractive appearance by avoiding compression, dehydration and discoloration of the portions during freezing and subsequent storage and delivery before they are cooked for serving.

Individual serving portions of uncooked meat sold to establishments serving food to the public, such as restaurants and food stands, are frequently delivered by the packer in a partially or wholly frozen condition to protect them against spoilage. Desirable and important factors in such sale are to retain substantially all of the original moisture and natural juices in the meat and to provide that the color of the portions in their frozen condition be as close as possible to their color in their unfrozen state to provide a fresh, attractive appearance. From the production standpoint, it is desirable also to produce and freeze the portions in a continuous production line in which handling them manually is substantially eliminated.

Various practices have heretofore been followed to produce these results, including exposing the portions to a temperature below zero in a freezing-room, exposing them to blasts of extremely cold air, and the like. These methods frequently have the disadvantage that a white crust tends to form on the surface of the meat due to condensation of the moisture from the surrounding air, or the other surface may be turned gray or even white as the result of dehydration in the process of freezing them rapidly.

It is a primary object of the present invention to provide apparatus for quickly freezing individual serving portions of meat in a continuous production line operation, in which the portions are frozen rapidly immediately after having been cut or formed to seal in the juices, with minimum dehydration and essentially no discoloration. The entire freezing operation is automatic, without manual handling of the portions between a starting station and a discharge station, and the portions are automatically delivered in condition for packaging in the container in which they are delivered to the customer for refrigerator storage until sold.

As a more specific object, the present invention provides apparatus for quickly freezing serving portions of meat such as hamburger patties by rapidly conducting or transferring heat from the patty first primarily from one side and then primarily from the opposite side without cold air turbulence so that discoloration is avoided and the patties can be immediately packaged between sheets of paper in a suitable delivery container, without the patties sticking to each other or to the paper.

It is also an object of the invention to provide improved apparatus which receives a continuous supply of individual serving-size meat portions and successively freezes the portions one side at a time while the air adjacent the meat portions is prevented from significant movement or circulation to avoid dehydration of the meat products.

A further object of the present invention is to provide a novel quick freezing apparatus by which heat is conducted quickly from the meat portions by maintaining them in heat-transfer relation with a metal heat transferring surface to minimize discoloration of the portions and to reduce the time required for freezing.

As another object, the present invention provides apparatus for freezing individual serving portions of meat in a continuous process wherein the apparatus is enclosed within a freezing chamber or enclosure to provide an efficient freezing operation but the forming and packaging operations are performed outside the enclosure in a substantially warmer environment for the comfort and convenience of the personnel working on the goods.

Other objects and advantages of the invention will be apparent from the following description, the accompanying drawings and the appended claims.

In the drawings—

FIG. 1 is a perspective view showing somewhat schematically an apparatus constructed and installed in accordance with the invention to carry out the process of the invention;

FIG. 2 is a detailed elevational view of the receiving and transfer portions of the apparatus shown in FIG. 1;

FIG. 3 is a detailed elevational view of the discharge portion of the apparatus of FIG. 1, showing the delivery of the individual meat portions from the apparatus to a packaging station;

FIG. 4 is a cross-sectional view of a freezing conveyor as seen along the line 4—4 of FIG. 2;

FIG. 5 is a detailed elevational view of the center portion of the apparatus showing a preferred form of transfer of the meat portions from the first freezing conveyor to the second freezing conveyor;

FIG. 6 is an alternative form of apparatus using a single conveyor belt and a turning mechanism; and FIG. 7 is a plan view of another embodiment of the apparatus illustrating an arrangement for a corner installation.

Referring to the drawings, which illustrate preferred embodiments of the invention, an apparatus for quickly freezing a continuous supply of hamburger patties at a rapid rate is illustrated in FIG. 1. The apparatus and process are described for convenience in terms of use in freezing ground beef, pork and veal patties because of the large market for these goods and because this is the purpose for which the invention has thus far principally been used by applicant. It is to be understood, however, that the invention has been successfully employed for other individual portion-size meat products such as cube steaks, minute steaks, and the like.

The invention is not limited to any particular kind of meat product, but is applicable to any product which it is desirable to freeze quickly on each side without compressing the respective portions so that the portions will retain their original moisture, juices and color, and can be immediately packed in the containers in which they will be retained in the refrgerator and in which they will be delivered when sold.

When the apparatus is employed for quick freezing hamburger patties, the ground meat, which has been cooled to around 28° F., is fed into the hopper 17 of an automatic patty forming machine 20 such as the Model 240 manufactured by the Bridge Machine Co., Palmyra, N.J. This machine is adapted to supply a continuous successive flow of patties 22 which are delivered in rows onto a chain conveyor 23 (FIG. 2).

It is desirable although not essential that the patties then be fed through a series of tenderizing knives 24 which cut and score them to provide the patties with a rough and irregular chopped surface on each side. The patties 22 are then feed onto an inclined endless chain conveyor 28 having an upper portion 30 which extends through the opening 31 formed in the wall 33 of a freezer chamber or enclosure 35. The temperature within the freezer enclosure 35 is preferably maintained at 0° F. or below by a suitable refrigeration system 36. The enclosure chamber 35 also prevents significant movement or circulation of the air confined therein.

As shown in FIG. 2, supporting the upper end of the chain conveyor 28 is a small diameter guide roll 38 which is positioned adjacent the receiving end of an endless belt conveyor 40 so that the patties 22 are automatically fed directly from the chain conveyor onto the upper conveying surface 41 of the endless belt 42. The belt is maintained in heat exchanging relation with a coolant maintained below its lower surface so that the temperature of its upper surface and accordingly that to which the meat portions are exposed may readily be controlled. Preferably, the belt 42 is formed from corrosion resistant stainless steel and has secured to its inner surface adjacent the edges thereof a pair of endless V-belts 45 (FIG. 4). The V-belts 45 are directed around a pair of pulleys 48 mounted on the shaft 50 rotatably supported within the bearing members 51 and the pulleys 52 mounted on the shaft 54 rotatably supported within the bearing members 55.

The bearing members 51 and 55 are supported by a frame 56 which includes the longitudinally extending members 58 and 59 and the connecting leg members 60 and 61. As shown in FIG. 4, the stainless steel belt 42 carried by the endless V-belts 45 is supported along the upper reach of the conveyor by the longitudinally extending plastic runners 65 mounted on the vertical walls 67 of a container 70 which extends substantially the full length of the upper reach. As shown, the container 70 cooperates with lower surface 71 of the belt 42 to define a chamber 72 which is supplied with a fluid coolant, as for example, a liquid solution formed of 50% propylene glycol and 50% water, maintained in heat exchanging relation with the belt 42, as stated. The outer edges 73 of the belt 42 extend appreciably outward of the walls 67 so that excess coolant is entirely prevented from coming into contact with the upper surface of the belt or the meat products on it.

The coolant is supplied to the chamber 72 by a series of conduits 74 which lead from a suitable refrigeration unit 75 (FIG. 1). It has been found advantageous to keep the coolant constantly agitated by spraying it upwardly against the lower surface 71 of the belt 42 from the tube 76 to maintain the upper conveying surface 41 at a predetermined temperature preferably between −0° to −40° F., and to provide for continuous rapid transfer of heat from the products on the upper surface of the belt through the belt to a continuously refreshed supply of the low-temperature coolant. By this means the upper surface of the belt may be maintained at a substantially uniform low temperature which does not differ appreciably from that of the coolant.

By reason of its outwardly extending edges 73, the belt isolates the coolant from its upper surface and from the meat portions thereon. The coolant is discharged between the upper edge of the plastic runners 65 and the adjacent lower surface of the belt 42 and flows continuously into the overflow troughs 77 and into the drain manifold 78. The coolant collected within the drain manifold 78 is then recirculated into the refrigeration unit which reduces the temperature to the desired predetermined low temperature. The general construction of the freezing conveyor 40 as employed herein is disclosed in United States Patent No. 2,844,359 and it is to be understood that the specific construction of the conveyor itself forms no part of the present invention. This construction is a preferred form, however, because it prevents the coolant from coming into contact with the upper conveying surface 41 or with the patties 22 carried on it.

The conveyor 42 is driven by a variable speed drive 79 (FIG. 2) which is connected by a chain 80 to a sprocket 81 rigidly mounted on the shaft 54 so that the speed of the belt 42 can be adjusted, as for example, from between six and thirty feet per minute according to the thickness of the meat patty or product being frozen and the desired degree of freezing while the product is on the belt.

After travelling the length of the conveyor 42, the patties 22 reach the discharge end or station of the conveyor as the belt passes around the pulleys 52. At this point, the bottom side or surface portion of each patty is frozen with practically no discoloration. This desirable result is attributed to the quick heat transfer from the bottom surface portion of the patty 22 through the metal belt 42 in an atmosphere of cold, still air adjacent the patties 22.

Stated more fully, it has been found that, by preventing significant circulation of the cold dry air adjacent the patties 22 in the room 35, substantially no dehydration of the patties and substantially no discoloration occurs. Applicant believes that this is due in substantial part to the fact that the forming and tenderizing operations leave the patties with small but definite difference in the planes of the lowest and highest areas on each surface. The effect is thus a somewhat roughened surface with peaks and depressions of small area. The result is that the portions of the total surface of the patties which come in actual contact with the belt surface are a relatively small proportion of the whole, and by reason of this relatively small contact area, surface discoloration is minimized. This spot contact has been found to provide slightly better overall color retention than when the patties are formed with substantially flat sides since the heat is conducted primarily through the high spots. It has been found that these variations in the surface tend to be increased if the patties, after forming, are passed through the tenderizing knives 24.

During passage of the patties 22 from the receiving station to the discharge station on upper conveyor surface 41, their bottom sides have been frozen and their top sides have been substantially cooled by the 0° F. temperature within enclosure 35. They accordingly have become semi-rigid and tend to break away from the belt 42 across a relatively short longitudinal area where the belt curves around the pulley 52. To insure proper separation, a stripping member 82 (FIG. 5) is provided adjacent the belt 42 and preferably at the centerline of the support shaft 54. The sharp leading edge 83 of the stripping member 82 is preferably coated with a layer of fluorocarbon material such, for example, as that sold under the trademark Teflon. This edge is positioned for entering the slight gap defined by the frozen side of the patties 22 and the outer surface of the belt 42 and thereby frees any patties 22 which may have stuck to the belt so that each successive row of patties will fall onto and slide along the inner surface of a curved guide chute 85. It has been found in practice that better results are obtained if vibrator units, indicated diagrammatically at 86, are attached to the turning chute to vibrate the stripping member and the chute, to which the stripping member is attached.

The momentum resulting from this slide carries the patties into engagement with a stationary stop member 87 (FIG. 5) which extends transversely across the upper surface 89 of an endless stainless steel belt 90 forming a part of a lower second conveyor 92. In this transfer, the patties are turned over or inverted, with their frozen sides positioned upward and their unfrozen but cooled sides now in contact with the upper surface 89 of the conveyor belt 90. The inside curved surface of the guide chute 85 may be coated with strips of a fluorocarbon material such as the Teflon material mentioned above to provide a low friction surface which maintains the patties in proper longitudinal alignment on the belts, while the stop member 87 reestablishes and maintains the proper lateral alignment on the conveyor belt 90. It has also been found that the fluorocarbon coating prevents a build-up or deposit of meat particles and of frost on the inner surface of the guide chute 85 which could prevent the patties from sliding smoothly down the chute 85.

The endless belt conveyor 92 is substantially identical to the conveyor 40 but, as shown in FIGS. 2 and 3, is supported at a lower level by a frame 95 which rotatably supports the shafts 50 and 54 and the pulleys 48 and 52 mounted thereon. The upper conveying surface 89 of the belt 90 is cooled to within −10° to −40° F. by a fluid refrigeration system corresponding to that employed for the conveyor 40, which includes the elongated pan or container 70 for confining the liquid coolant. Thus, like reference numbers have been applied to the components of the freezer conveyor 92 which correspond to those of the conveyor 40.

As appears from FIGS. 1 and 2, successive rows of patties aligned on surface 89 by stop member 87 must travel beyond the delivery end of guide chute 85 before the next successive row arrives so as to avoid interference between successive rows. This result is obtained either by delivering successive rows of patties on conveyor 40 so timed that successive rows are spaced more than the diameter of a patty apart, or by operating the second conveyor 92 at a somewhat faster rate of speed than conveyor 40, or by a combination of the two methods.

When the patties 22 reach the discharge end or station of the second conveyor 92, the receiving end of a guide chute 104 strips the patties from the conveyor belt 90 as shown in FIG. 3 and directs them through an opening 106 formed in the end wall 107 of the freezer room 35 and downwardly to a packaging station 108. At this station the patties 22 received from the chute 104 are in proper lateral and longitudinal alignment and may be packed directly into a container 110, preferably between sheets or layers of suitable waxed or other patty-paper to maintain proper separation between layers of patties. After the containers 110 are full, they are then maintained at a temperature substantially below 32° F. by placing them in a freezing unit, as for example, the freezer room 35 for maintaining their frozen exterior condition and completing the freezing of any internal portion which may not already have been frozen.

While the apparatus is shown installed in a room sized freezing chamber or enclosure, the operation itself is automatic, and the apparatus may thus be enclosed in a hood or passage shaped enclosure, dimensioned merely to enclose the apparatus, with relatively small openings at each end for passage of the patties into and out of the enclosure. In either form, the inspection of proper formation of the patties before they enter the freezing chamber and the packaging operation can both be carried out in surroundings considerably warmer than the temperature of approximately 0° F. or below at which the freezing enclosure is maintained. Use of a room sized enclosure, however, provides the advantage of easy access for adjusting, cleaning and otherwise taking care of the conveying, turn over and freezing apparatus.

Frozen portions may be separated from each other as they are packed for delivery by sheets of paper of substantially the size of the packing box separating each course or layer of patties from that below it. It is also possible to separate the patties by providing an individual separation paper for each patty. If individual separation sheets are desired, they may most efficiently be inserted by passing the formed patties through a paper interleaving apparatus of any appropriate type such, as for example, as is indicated diagrammatically in FIG. 6 by the numeral 115, where it is positioned after the patty forming machine and ahead of the chain conveyor 28 to freeze the portions on individual sheets. Interleaver apparatus of the type manufactured by Bridge Machine Company, Palmyra, N.J., has been found satisfactory for this purpose. Alternatively, the paper interleaving apparatus may be positioned at the discharge station adjacent the packaging station 108, not shown, for individual interleaving after the portions are frozen.

Interposition of the paper between the respective patties 22 and the conveying surface 41a before freezing has been found to have no significant effect on the rate of heat transfer from the patties through the conveyor belt 42a into the refrigerant, and the quality and appearance of the patties frozen while on individual patty papers has been found to be indistinguishable from that of the patties frozen when in direct contact with the conveying surface. When individual patty-papers are inserted before freezing, however, there has been a tendency with the two belt form of apparatus shown in FIGS. 1 and 2 for the papers to become detached from the patties at the point at which the patties are removed from the belt 42 by the stripping member 82, with a resulting tendency of the detached papers to interfere with the action of the stripping member and of the curved guide chute 85. Where it is desired to freeze the patties on individual patty-papers, therefore, the invention contemplates use of another embodiment as shown in FIG. 6, which employs a single conveyor system in connection with a turn-over device, instead of the two separate endless belt conveyors shown in FIGS. 1 and 2.

In this embodiment, the components which are substantially the same as those employed in the apparatus shown in FIGS. 1 and 2 are referred to by like reference numbers with the addition of the suffix "a." Referring to FIG. 6, the patties 22, each placed on its individual patty-paper by the paper interleaving machine 115, are received from the interleaving machine on the endless chain conveyor 28a and transported to the receiving station of upper conveying surface 41a of the endless stainless steel belt conveyor 40a. Positioned substantially mid-way between the receiving and discharge ends of the belt conveyor 40a and above the conveying surface 41a is a turning mechanism indicated generally by the numeral 120 which is adapted to invert the patties 22 for placing the opposite side of each patty in heat transfer relationship with the conveying surfaces 41a in a manner similar to the operation provided by the guide chute 85 shown in FIG. 5.

The turning mechanism 120 includes an overhead endless chain conveyor 122 which is directed around the sprockets 124 affixed to the respective shafts 125 rotatably supported (not shown) by the frame 56a. Carried by conveyor 122 are a series of parallel spaced conveying or pusher members 128 positioned transversely of the conveying surface 41a, which are adapted to engage the rear edges of the patties 22 arranged in a row and move the patties along the slightly inclined surface provided by a guide member 130. Thus as the rows of patties 22 reach the upper edge of the guide member 130, the patties quickly roll over to an inverted position and slide downwardly along the curved inner surface of the guide chute 132, providing the patties with sufficient momentum to engage a laterally extending stop member 134. This stop member realigns the patties in parallel rows on the conveying surface 41a in substantially the same location as when they were removed by the leading edge of the guide member 130 so that the patties continue to move along the second portion of the conveying surface 41a to the end discharge station of the belt conveyor 40a where the patties are removed by the chute 104a.

The chain conveyor 22 is driven by a motor 136 which is connected to rotate the upper shaft 125 and is operated in timed relationship with the drive unit 79a for the belt conveyor 40a by a controller 138. This coordinated speed relationship between the chain conveyor 122 and the belt conveyor 40a has been found desirable to maintain the uniform spacing between the rows of patties 22 on the conveying surface 41a after the patties are inverted by the turning mechanism 20.

FIG. 7 shows schematically a further modified form of the apparatus according to the present invention which is adapted to be installed within the corner area of a freezing chamber or enclosure when the length of the chamber is not sufficient to accommodate an apparatus as shown in FIGS. 1 or 6. According to this modification, two separate endless belt freezing conveyors 140 and 142 similar to the conveyors 40 and 41 are positioned at right angles to each other and are connected by a 90° or right angle conveyor 143, as for example, a flexible wire conveyor of the type manufactured by The Stewart Engineering and Equipment Company of Richardson, Tex. Positioned above the receiving end of the endless belt conveyor 122 is a turning mechanism 120 as shown in elevation in FIG. 6 for inverting the patties onto the upper conveying surface of the conveyor 142, corresponding in construction to that already described in connection with FIG. 6.

As can be seen from the drawings and the foregoing description, the quick freezing apparatus of the present invention provides a number of desirable features and advantages. Individual serving portions such as hamburger patties, minute steaks, club steaks, and the like can readily be processed at a rate of upwards of 10,000 serving portions per hour automatically and without any manual handling. Since the frozen patties are presented at the removal station row by row in proper uniform alignment, they may be packaged rapidly and easily. Furthermore, the quick freezing of both sides of the patties by the fast transfer of heat through the metal belts 42 and 90 is performed without compressing the meat patties so that they will retain their original juices.

In addition, as a result of enclosing the freezing conveyors 40 and 92 within the freezer enclosure or room 35, the air adjacent the patties is prevented from any significant moving or circulation, and as a result dehydration of the individual meat portions has been found to be reduced substantially. The freezer room 35 having a temperature of 0° F. or below also helps maintain the temperature of the upper surfaces of the belt conveyors 40 and 92 substantially below 0° F. which prevents the surfaces from warming up to a point which would result in a less efficient quick freezing operation of the meat portions. It has also been found that the temperature of the room 35 will cool the top side of the patties 22 on the conveyor 40 so that when the patties are transferred to the conveyor 92, the temperature differential between the upper surface 89 of the belt 90 and the bottom side of the patties at the time of transfer has been substantially reduced. This condition has been found further to contribute to preventing discoloration of the patties.

Inclusion of a tenderizing operation in the process appears to reduce the surface area of contact with the respective product which is on the upper surface of each belt, with resulting improvement in the appearance of the frozen product.

Furthermore, it becomes apparent that the continuously operating apparatus of the present invention can be constructed in several different forms according to the size and shape of the freezing chamber or enclosure 35. Irrespective of the particular form used, however, a basic concept of the invention is that the rows of meat portions are continuously moved along a first freezing conveying surface of an endless belt conveyor for sufficient time to enable one side of each portion to be frozen, after which the portions are inverted and conveyed along a second freezing conveying surface until the opposite side of each patty is frozen. This sequence of operation along with the substantial elimination of air movement of circulation adjacent the meat portions has been found to provide the highly desirable results outlined above.

While the forms of apparatus herein described constitute preferred embodiments of the invention, it is to be understood that the invention is not limited to this precise form of apparatus, and that changes may be made therein without departing from the scope of the invention, which is defined in the appended claims.

What is claimed is:

1. Apparatus for quick freezing articles such as individual serving portions of uncooked meat in a continuous operation and adapted to handle articles of different sizes and thicknesses, comprising:

endless belt conveyor means including a first conveying surface for conveying the articles from a first receiving station to a first discharge station with one side of each article facing said first conveying surface, and a second conveying surface positioned with a second receiving station adjacent said first discharge station for receiving the articles from said first discharge station and carrying them from said second receiving station to a second discharge station;

means for successively transferring and inverting the articles from said first discharge station onto said second receiving station;

refrigeration means for maintaining the temperatures of said first and second conveying surface substantially below 0° F.;

means for driving said conveying means;

means for removing the articles from the discharge station of said second conveying surface; and means for preventing significant air circulation or movement adjacent said articles while on said conveyor means.

2. Apparatus as defined in claim 1 including rotary knife tenderizing means for scoring the surface of uncooked meat portions to provide a limited area of exposure between the respective sides of the portions and said first and second conveying surfaces to minimize discoloration of the portions.

3. Apparatus as defined in claim 2 including pattypaper interleaving means positioned ahead of said first conveyor surface for interposing individual sheets of pattypaper beneath each respective serving portion.

4. Apparatus for quick freezing articles such as individual serving portions of uncooked meat in a continuous operation and adapted to handle articles of different sizes and thickness, comprising:

a first endless conveyor belt having a conveying surface adapted to carry said articles from a first receiving area to a first discharge area with one side of the articles facing said conveying surface;

a second endless belt positioned with a second receiving area adjacent said first discharge area and having a conveying surface adapted to carry said articles from said second receiving area to a second discharge area;

means for transferring and inverting said articles from said first discharge area to said second receiving area so that the opposite side of each said article faces said second conveying surface of said second belt;

refrigeration means in heat transfer relation with said conveying surfaces of said first and second conveyor belts for maintaining the temperatures of said conveying surfaces substantially below 0° F.;

means for driving said conveyor belts;

means for removing the articles from said second discharge area; and means for enclosing said conveying surfaces of said first and second belts within a chamber for minimizing air circulation and movement adjacent said articles on said conveying surfaces.

5. Apparatus for forming and quick freezing articles such as individual uncooked meat portions and adapted to handle articles of different sizes and thickness, comprising:

means for continuously forming successive rows of articles;

endless metal belt conveyor means including a first conveying surface adapted to receive the articles from said forming means and to carry them to a first discharge station with one side of each article facing said first conveying surface;

said conveyor means further including a second conveying surface positioned with a second receiving station adjacent said first discharge station and adapted to carry each article from said second receiving station to a second discharge station;

means for transferring and inverting the articles from said first discharge station to said second receiving station with the opposite sides of the articles facing said second conveying surface;

refrigeration means in heat transfer relation with the under sides of said first and second conveying surfaces and isolated from said surfaces for maintaining the temperatures of said first and second conveying surfaces substantially below 0° F.;

means for driving said conveyor means;

means for removing the articles from said second discharge station; and means for enclosing said first and second conveying surfaces within a chamber for minimizing air circulation and movement adjacent the articles.

6. Apparatus for forming and quick freezing individual uncooked meat patties in a continuous operation to avoid compression, dehydration and discoloration of the patties, and which is adapted to freeze patties of different sizes and thicknesses, comprising:

means for continuously formig successive rows of patties;

a first endless metal belt conveyor having a first conveying surface adapted to receive the patties from said forming means and to carry them to a first discharge area with one side of the patties facing said first conveying surface;

a second endless metal belt conveyor having a second conveying surface positioned with a second receiving area adjacent and below said first discharge area and adapted to carry the patties to a second discharge area;

means for stripping and guiding the patties from said first conveying surface at said first discharge area for transferring and inverting them to said second receiving area with the opposite sides of the patties facing said second conveying surface;

stop means adjacent said second conveying surface to maintain alignment of the patties on said surface;

means for confining a refrigerated liquid coolant adjacent the lower surface of the metal belts under and isolating it from said first and second conveying surfaces for maintaining the temperatures of said first and second conveying surfaces below —0° F.;

means for driving said first and second conveyors;

means for removing the patties from said second discharge area and to deliver the patties to a packaging station;

means for enclosing said first and second conveyors within an enclosure for minimizing air circulation and movement adjacent the meat patties on said conveying surfaces to avoid dehydration and discoloration of the patties; and refrigeration means for maintaining the temperature of said enclosure substantially below 32° F. to prevent significant heat transfer to said first and second belt conveyors.

7. Apparatus for quick freezing articles in a continuous process and adapted to handle articles of different sizes and thickness, comprising:

endless belt conveyor means having at least one conveying surface;

means defining a receiving station where the articles are deposited on said conveyor means with one side adjacent said conveying surface;

means spaced from said receiving station and adjacent said conveying surface for inverting the articles to position the opposite side of each article adjacent said conveying surface;

refrigeration means for maintaining said conveying surface at a temperature substantially below 32° F. for quick transfer of heat successively from the respective sides of each article while carried by said conveyor means; and means spaced from said inverting means for defining a discharge station where the articles are removed from said conveying surface.

References Cited

UNITED STATES PATENTS

| 1,773,079 | 8/1930 | Birdseye | 62—63 |
| 1,817,890 | 8/1931 | Birdseye | 62—63 |
| 1,822,077 | 9/1931 | Birdseye | 62—303 |
| 1,822,124 | 9/1931 | Birdseye | 62—63 |
| 1,977,373 | 10/1934 | Birdseye | 62—63 |

WILLIAM J. WYE, *Primary Examiner.*